United States Patent Office 3,465,054
Patented Sept. 2, 1969

3,465,054
PROCESS FOR THE MANUFACTURE OF
2,2-DICHLOROBUTANE
Kurt Sennewald and Wilhelm Vogt, Knapsack, near Cologne, and Herbert Baader, Hermulheim, near Cologne, Germany, assignors to Knapsack Aktiengesellschaft, Knapsack, near Cologne, Germany, a corporation of Germany
No Drawing. Filed June 25, 1965, Ser. No. 467,122
Claims priority, application Germany, July 15, 1964, K 53,476
Int. Cl. C07c 17/08
U.S. Cl. 260—663                    4 Claims

ABSTRACT OF THE DISCLOSURE

A noncatalytic process for producing 2,2-dichlorobutane by contacting butyne-(2) with hydrogen chloride gas at −50° through 100° C. and 1–50 atmospheres pressure.

---

2,2-dichlorobutane is an important starting product for making 2-chlorobutadiene-(1,3) or butadiene-(1,3).

It is known that 2,2-dichlorobutane can be prepared from methylethylketone and phosphorus pentachloride. 2,2-dichlorobutane is also obtained in addition to other products by reacting chlorine in a proportion slightly smaller than 1 mol with chlorobutane with exposure to light or by chlorinating butane or butene.

The disadvantages associated with conventional processes which use methylethylketone as the starting material reside in the fact that costly phosphorus pentoxide must be used and that the resulting final products call for a rather extensive work up.

The chlorination of butane, butene and 2-chlorobutane also gives poor yields of 2,2-dichlorobutane; isomers are always formed which impede the separation of 2,2-dichlorobutane by distillation. The chlorination generally calls for the presence of a catalyst and/or for the application of relatively high temperatures.

It has now unexpectedly been found that the difficulties mentioned above can be avoided by the present invention, which comprises preparing 2,2-dichlorobutane by the additive combination of 2 mols hydrogen chloride with butyne-(2) under elevated pressure.

The process is easy to carry out. Butyne-(2) is introduced into an autoclave and an excess proportion of hydrogen chloride gas is forced into the autoclave under pressure. Decrease in pressure and increase in temperature indicate at once that the reaction has started. When the decrease in pressure has ceased, the hydrogen chloride in excess is allowed to escape, the product obtained is scrubbed with water, and distilled. The principal product obtained is 2,2-dichlorobutane which is accompanied by a small amount of a relatively high-boiling oil readily separable from 2,2-dichlorobutane which boils at a temperature of 102 to 104° C.

The fact that the present process enables 2,2-dichlorobutane to be prepared is an unexpected result because the intended reaction fails to take place at atmospheric pressure or under a slight HCl pressure of up to about 0.25 atmosphere. Applying pressure as taught by the process of the present invention results in the direct formation of 2,2-dichlorobutane without any formation of monochlorinated products.

The preparation of 2,2-dichlorobutane by the present process is also advantageous under technical aspects. As butyne-(2) is obtained as a waste product during the manufacture of butadiene-(1,3) from butane, it is possible in this manner to produce an important starting product for making 2-chlorobutadiene-(1,3).

As opposed to such methods as use methylethylketone as the starting material, no costly chlorinating agent is consumed, and the resulting reaction product is easy to work up. Still further no difficulties will be encountered during distillation due to the absence of any formation of isomeric chlorination products of the type obtained with starting substances such as butane, butene and 2-chlorobutane.

The process of the present invention provides more especially a process for the manufacture of 2,2-dichlorobutane, which comprises treating butyne-(2) with hydrogen chloride gas under a pressure of 1 to 50 atmospheres (gauge pressure), preferably under a pressure of 20 to 40 atmospheres (gauge pressure). The process preferably comprises reacting the butyne-(2) with hydrogen chloride gas maintained under a constant pressure of 1 to 50 atmospheres (gauge pressure) preferably of 20 to 40 atmospheres (gauge pressure), for a period of time sufficient to arrest any decrease in pressure, allowing hydrogen chloride in excess to escape, scrubbing the reaction product obtained with water in conventional manner, and distilling it. The reaction is carried out at temperatures of −50 to +100° C., preferably at a temperature of between 20 and 70° C. with continuous cooling.

The following examples illustrate the process of the present invention:

EXAMPLE 1

100 grams butyne-(2) (boiling point: +27° C.) were charged into a 0.5 liter autoclave and hydrogen chloride was then introduced continuously under a pressure of 30 atmospheres (gauge pressure) at 20° C. until the pressure ceased to decrease. The temperature rose to about 40° C. while the autoclave was cooled with water. After the reaction was complete, which took about 0.5 to 1 hour, the hydrogen chloride in excess was allowed to escape, the reaction product obtained was scrubbed with water and distilled. 142 grams 2,2-dichlorobutane (boiling point: 102–104° C.) were obtained. The yield was 60.5%, calculated on the butyne-(2) used. The balance butyne-(2) proportion had polymerized.

EXAMPLE 2

The procedure described in Example 1 was repeated at a temperature of −25° C. Again, the hydrogen chloride pressure was maintained constant at 30 atmospheres (gauge pressure). The reaction which started at a pressure as low as about 1 to 2 atmospheres (gauge pressure) could be kept constant at that pressure but at the price of a prolonged time of reaction. The temperature rose up 70° C. while cooling with water. After about 1 hour, the pressure ceased to decrease, and the reaction was complete. 2,2-dichlorobutane was obtained in a yield of 61%, calculated on the butyne-(2) used.

We claim:
1. A noncatalytic process for the manufacture of 2,2-dichlorobutane, which comprises reacting butyne-(2) with hydrogen chloride gas at a temperature of about −50° C. through +100° C. and a pressure of about 1–50 atmospheres.
2. The process as claimed in claim 1, wherein the pressure is maintained at 20 to 40 atmospheres.
3. The process of claim 1, which comprises reacting the butyne-(2) with hydrogen chloride gas maintained under a constant pressure between 1 and 50 atmospheres for a period of time sufficient to arrest any decrease in pressure, allowing hydrogen chloride in excess to escape, scrubbing reaction product obtained with water and distilling the reaction product.

4. The process of claim 1, wherein the reaction is carried out at a temperature within the range of 20°–70° C. while continuously cooling.

References Cited

UNITED STATES PATENTS

| | | | |
|---|---|---|---|
| 2,522,687 | 9/1950 | Padgitt et al. | 260—663 |
| 2,945,897 | 7/1960 | Eisenlohr | 260—663 |
| 3,059,034 | 10/1962 | Prez | 260—663 X |

DANIEL D. HORWITZ, Primary Examiner